(12) United States Patent
Hethcock et al.

(10) Patent No.: US 9,757,883 B2
(45) Date of Patent: Sep. 12, 2017

(54) JOINING STRUCTURAL MEMBERS USING FOAM

(71) Applicant: Bell Helicopter Textron Inc., Fort Worth, TX (US)

(72) Inventors: James Donn Hethcock, Colleyville, TX (US); Dave Carlson, Fort Worth, TX (US); Paul K. Oldroyd, Azle, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 273 days.

(21) Appl. No.: 14/496,275

(22) Filed: Sep. 25, 2014

(65) Prior Publication Data

US 2016/0089830 A1    Mar. 31, 2016

(51) Int. Cl.
| | | |
|---|---|---|
| *B29C 44/08* | (2006.01) | |
| *B29C 44/12* | (2006.01) | |
| *B29L 31/30* | (2006.01) | |
| *B29L 31/08* | (2006.01) | |
| *B29L 31/60* | (2006.01) | |

(52) U.S. Cl.
CPC .......... *B29C 44/08* (2013.01); *B29C 44/1223* (2013.01); *B29L 2031/082* (2013.01); *B29L 2031/3076* (2013.01); *B29L 2031/3088* (2013.01); *B29L 2031/608* (2013.01)

(58) Field of Classification Search
CPC ..... B29L 2031/3088; B29L 2031/3076; B29L 2031/082; B29L 2031/608; B29C 44/08; B29C 44/1223
See application file for complete search history.

(56) References Cited

U.S. PATENT DOCUMENTS

| | | |
|---|---|---|
| 3,873,654 A | 3/1975 | Smith |
| 4,284,457 A | 8/1981 | Stonier et al. |
| 4,335,174 A | 6/1982 | Belko |
| 2005/0136239 A1* | 6/2005 | Eichinger ........... B29C 44/0461 428/304.4 |
| 2012/0114897 A1 | 5/2012 | Thiagarajan et al. |

FOREIGN PATENT DOCUMENTS

| | | |
|---|---|---|
| EP | 2635431 | 9/2013 |
| WO | 2012060910 | 5/2012 |

\* cited by examiner

*Primary Examiner* — Vishal I Patel

(57) ABSTRACT

One aspect of a process of forming an aircraft component includes bonding a first end of a honeycomb structure to a surface of an aircraft skin member, the honeycomb structure including multiple connected cells. Foam is sprayed on a second end of the honeycomb structure opposite the first end. The process also includes curing the foam on the second end of the honeycomb structure.

20 Claims, 10 Drawing Sheets

JOINING STRUCTURAL MEMBERS USING FOAM

TECHNICAL FIELD

This disclosure relates to manufacturing components which include skin members and foam.

BACKGROUND

Structural components in an aircraft can be made of a supported skin that forms the shape of the component. In some cases, the skin is made of multiple skin members that form the desired shape. For example, the skin members can be contoured sheets or plates of metal or composite materials that are attached at the edges. For aircraft structural components, it is desirable to minimize weight while maintaining stability and structural integrity. Reducing the weight of structural components can reduce fuel consumption and reduce the size of engines used to maintain flight operation. In some cases, to provide stability and rigidity, the components are filled with a foam, such as an expandable polyurethane foam or machined foam inserts. A foam can provide structural support at a lower weight than other techniques, such as metal or plastic supports.

SUMMARY

This disclosure describes technologies relating to manufacturing components that include skin members and foam.

Certain aspects of the subject matter described here can be implemented as a method of forming an aircraft component. The method includes bonding a first end of a honeycomb structure to a surface of an aircraft skin member, the honeycomb structure including multiple connected cells. The method includes spraying foam on a second end of the honeycomb structure, the second end opposite the first end. The method also includes curing the foam on the second end of the honeycomb structure.

This, and other aspects, can include one or more of the following features. The aircraft skin member can be a first aircraft skin member and the honeycomb structure can be a first honeycomb structure. The method can include bonding a first end of a second honeycomb structure to a surface of a second aircraft skin member, the second honeycomb structure including multiple connected cells. The method can include positioning an end of the first aircraft skin member adjacent an end of the second aircraft skin member to form a void in which the foam on the first honeycomb structure can be positioned adjacent the second honeycomb structure. The method can include spraying foam in the void and on a second end of the second honeycomb structure and the foam on the first honeycomb structure, the second end of the second honeycomb structure opposite the first end of the second honeycomb structure. The method can also include curing the foam on the second end of the second honeycomb structure and the foam on the first honeycomb structure. The method can include, before spraying foam on the second end of the first honeycomb structure and curing the foam on the second end of the first honeycomb structure, bonding a first end of a second honeycomb structure to a surface of a second aircraft skin member, the second honeycomb structure including multiple connected cells, positioning an end of the first aircraft skin member adjacent an end of the second aircraft skin member to form a void in which the first honeycomb structure can be positioned adjacent the second honeycomb structure, spraying foam in the void and on the second end of the first honeycomb structure and a second end of the second honeycomb structure, the second end of the second honeycomb structure opposite the first end of the second honeycomb structure, and curing the foam on the second end of the first honeycomb structure and the second end of the second honeycomb structure. The method can include spraying foam on a second end of the second honeycomb structure, the second end opposite the first end of the second honeycomb structure. The method can include curing the foam on the second end of the second honeycomb structure. The method can include positioning an end of the first aircraft skin member adjacent an end of the second aircraft skin member to form a void in which the foam on the first honeycomb structure can be positioned adjacent the foam on the second honeycomb structure. The method can include spraying foam in the void and on the foam on the first honeycomb structure and the foam in the second honeycomb structure. The method can also include curing the foam sprayed in the void and on the foam on the first honeycomb structure and the foam in the second honeycomb structure. Spraying the foam on the second end of the honeycomb structure can include spraying a quantity of foam to fill at least a portion of a volume of the multiple connected cells of the honeycomb structure. Spraying the foam on the second end of the honeycomb structure can include spraying a quantity of foam to form a foam thickness that can be greater than a height of a tallest cell of the multiple connected cells. The aircraft skin member can be included in a helicopter blade. The surface of the aircraft skin member can be at least one of a flat surface, an open contoured surface or a closed contoured surface. Bonding the first end of a honeycomb structure to the surface of the aircraft skin member can include bonding the first end of the honeycomb structure in an undeformed state to the surface. The method can include deforming the honeycomb structure before bonding the first end of the honeycomb structure to the surface of the aircraft skin member.

Certain aspects of the subject matter described here can be implemented as a method of forming an aircraft component. The method includes bonding a first end of a honeycomb structure to a surface of an aircraft skin member, the honeycomb structure including multiple connected cells, each cell including multiple surfaces, wherein adjacent cells share a common vertical surface. The method includes spraying foam in a fluid state on a second end of the honeycomb structure, the second end opposite the first end. The method also includes curing the foam on the second end of the honeycomb structure from the fluid state to a solid state to bond the foam in the solid state to the aircraft skin member.

This, and other aspects, can include one or more of the following features. The aircraft skin member can be a first aircraft skin member and the honeycomb structure can be a first honeycomb structure. The method can include bonding a first end of a second honeycomb structure to a surface of a second aircraft skin member, the second honeycomb structure including multiple connected cells. The method can include positioning an end of the first aircraft skin member adjacent an end of the second aircraft skin member to form a void in which the foam on the first honeycomb structure can be positioned adjacent the second honeycomb structure. The method can include spraying foam in a liquid state in the void and on a second end of the second honeycomb structure and the foam in the solid state on the first honeycomb structure, the second end of the second honeycomb structure opposite the first end of the second honeycomb structure. The method can also include curing the foam in the liquid state on the second end of the second honeycomb structure and the foam in the solid state on the first honeycomb structure to a solid state to attach the first aircraft skin member to the second aircraft skin member. The method can include, before spraying foam on the second end of the first honeycomb structure and curing the foam on the second end of the first honeycomb structure, bonding a first end of a second honeycomb structure to a surface of a second aircraft skin member, the second honeycomb structure including multiple connected cells, positioning an end of the first aircraft skin member adjacent an end of the second aircraft skin member to form a void in which the first honeycomb structure can be positioned adjacent the second honeycomb structure, spraying foam in a liquid state in the void and on the second end of the first honeycomb structure and a second end of the second honeycomb structure, the second end of the second honeycomb structure opposite the first end of the second honeycomb structure, and curing the foam in the liquid state on the second end of the first honeycomb structure and the second end of the second honeycomb structure to a solid state to attach the first aircraft skin member to the second aircraft skin member. The method can include bonding a first end of a second honeycomb structure to a surface of a second aircraft skin member, the second honeycomb structure including multiple connected cells. The method can include spraying foam in a liquid state on a second end of the second honeycomb structure, the second end opposite the first end of the second honeycomb structure. The method can include curing the foam in the liquid state on the second end of the second honeycomb structure to a solid state. The method can include positioning an end of the first aircraft skin member adjacent an end of the second aircraft skin member to form a void in which the foam in the solid state on the first honeycomb structure can be positioned adjacent the foam in the solid state on the second honeycomb structure. The method can include spraying foam in a liquid state in the void and on the foam in the solid state on the first honeycomb structure and the foam in the solid state in the second honeycomb structure. The method can also include curing the foam in the liquid state sprayed in the void and on the foam in the solid state on the first honeycomb structure and the foam in the solid state in the second honeycomb structure to a solid state to attach the first aircraft skin member to the second aircraft skin member.

Certain aspects of the subject matter described here can be implemented as a method of forming an aircraft component. The method includes spraying foam in a liquid state on a first end of a honeycomb structure bonded to a second end of a surface of an aircraft skin member, the second end opposite the first end, the honeycomb structure including multiple connected cells. The method includes curing the foam in the liquid state on the second end of the honeycomb structure to a solid state to bond the foam to the aircraft skin member.

This, and other aspects, can include one or more of the following features. The aircraft skin member can be a first aircraft skin member and the honeycomb structure can be a first honeycomb structure. The method can include bonding a first end of a second honeycomb structure to a surface of a second aircraft skin member, the second honeycomb structure including multiple connected cells. The method can include positioning an end of the first aircraft skin member adjacent an end of the second aircraft skin member to form a void in which the foam on the first honeycomb structure can be positioned adjacent the second honeycomb structure. The method can include spraying foam in a liquid state in the void and on a second end of the second honeycomb structure and the foam in the solid state on the first honeycomb structure, the second end of the second honeycomb structure opposite the first end of the second honeycomb structure. The method can also include curing the foam in the liquid state on the second end of the second honeycomb structure and the foam in the solid state on the first honeycomb structure to a solid state to attach the first aircraft skin member to the second aircraft skin member. The method can include, before spraying foam on the second end of the first honeycomb structure and curing the foam on the second end of the first honeycomb structure, bonding a first end of a second honeycomb structure to a surface of a second aircraft skin member, the second honeycomb structure including multiple connected cells, positioning an end of the first aircraft skin member adjacent an end of the second aircraft skin member to form a void in which the first honeycomb structure can be positioned adjacent the second honeycomb structure, spraying foam in a liquid state in the void and on the second end of the first honeycomb structure and a second end of the second honeycomb structure, the second end of the second honeycomb structure opposite the first end of the second honeycomb structure, and curing the foam in the liquid state on the second end of the first honeycomb structure and the second end of the second honeycomb structure to a solid state to attach the first aircraft skin member to the second aircraft skin member. The method can also include bonding a first end of a second honeycomb structure to a surface of a second aircraft skin member, the second honeycomb structure including multiple connected cells. The method can include spraying foam in a liquid state on a second end of the second honeycomb structure, the second end opposite the first end of the second honeycomb structure. The method can include curing the foam in the liquid state on the second end of the second honeycomb structure to a solid state. The method can include positioning an end of the first aircraft skin member adjacent an end of the second aircraft skin member to form a void in which the foam in the solid state on the first honeycomb structure can be positioned adjacent the foam in the solid state on the second honeycomb structure. The method can include spraying foam in a liquid state in the void and on the foam in the solid state on the first honeycomb structure and the foam in the solid state in the second honeycomb structure. The method can also include curing the foam in the liquid state sprayed in the void and on the foam in the solid state on the first honeycomb structure and the foam in the solid state in the second honeycomb structure to a solid state to attach the first aircraft skin member to the second aircraft skin member. The method can include positioning an end of the first aircraft skin member adjacent an end of a second aircraft skin member including a surface bonded to a second honeycomb structure including multiple connected cells. The method can include positioning the surface of the first aircraft skin member and the surface of the second aircraft skin member at an angle to define a space. The method can include spraying foam in a liquid state in the space. The method can also include curing the foam in the liquid state to a solid state to bind the first aircraft skin member to the second aircraft skin member. The angle can range from greater than 0 degrees to at least 180 degrees.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
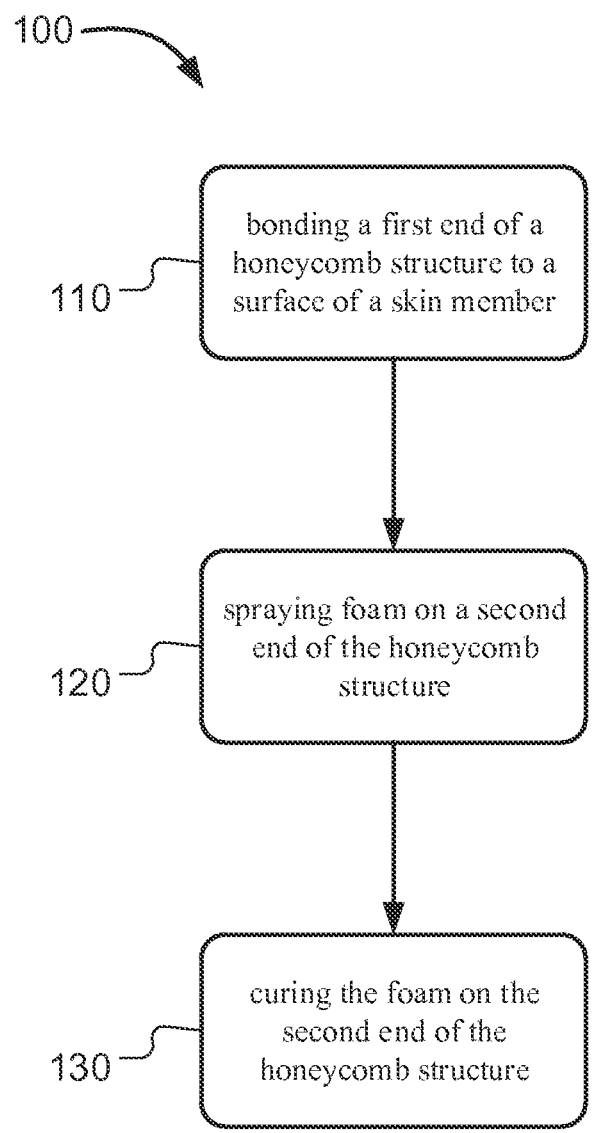
FIG. 1 is a flowchart of an example process for forming a component.

This disclosure relates to manufacturing components which include skin members and foam. In some industries, structural components are manufactured using skin members that form a surface supported by, adjacent to, or surrounding foam. For example, the foam can be foam inserts or an expansion foam. The use of skin and foam can provide structural rigidity at a low weight. However, the foam in such structures can be prone to peel and delamination in the foam adjacent to the skin or at the interface between the foam and the skin. Separation in the foam adjacent to the skin and separation between the foam and skin can compromise the structural integrity of the component, contribute to or cause structural failure of the component, and pose a serious safety hazard. For example, an external impact can deflect the skin and damage the underlying foam. Impact damage such as delamination or a void in the foam can significantly weaken the bond between the foam and the skin. The use of rigid supports such as ribs, longerons, or stringers instead of foam adds more weight and can also require expensive precision machining for irregularly shaped applications. The use of honeycomb core can reduce cost, but often results in increased weight. The use of foam inserts can provide stability at less weight, but can also require expensive machining for contoured or enclosed spaces.

The present disclosure describes a technique for manufacturing a component using skin members and foam. Some implementations of the technique use a honeycomb structure made of hollow cells to enhance mechanical properties of the structural interface between a skin member and the foam. In some implementations, the honeycomb structure is bonded to a surface of the skin member, and expansion foam is applied to the honeycomb structure and the skin member. The honeycomb structure provides additional bonding surface area for the foam, and thus can increase the strength of the foam's connection to the skin member. The honeycomb structure can also stiffen and stabilize the foam in the immediate proximity to the skin member, reducing the tendency for damage and increasing the structural connection between the skin and the foam. For example, the probability of damage to the foam and the severity of damage to the foam can be reduced during an impact event. Furthermore, the individual cells of the honeycomb structure can prevent delaminations propagating from one cell region to another cell region. The honeycomb structure provides a transition region between the skin member and the foam, and spreads out the concentrated loads from the interface into the foam. The use of the technique can provide increased stiffness and strength in areas of complex contour transitions in a component. The use of the technique can also provide improved acoustic and thermal isolation. Furthermore, the honeycomb structure can be easily deformed or machined as needed for the component. For example, the honeycomb structure can be deformed to conform to the shape of a component skin member. This enables components with irregular volumes or skin shapes to be stabilized that would otherwise require more costly machined interfaces or precision part interfaces. The properties of the honeycomb structure can be selected for the manufacture of a particular component. Example properties include the size of the honeycomb cells, the vertical height of the structure, the stiffness of the honeycomb structure, the texture of the honeycomb structure, the honeycomb structure material, or other properties.

FIG. 1 is a flowchart of an example process 100 for forming a component. The process 100 is applicable to any structural surface connection including skin members connected to an expandable foam material. For example, the process 100 can be implemented to form components for a rotorcraft or tiltrotor aircraft including rotor blades, tail-boom skins, horizontal stabilizers, control surfaces, wing skins, internal-to-external skin transitions, or other components. The process 100 can also be implemented to form components for other applications, including fixed-wing aircraft, unmanned aerial vehicles, automotive applications, aerospace applications, submersible applications, or other applications.

Figure 2A:
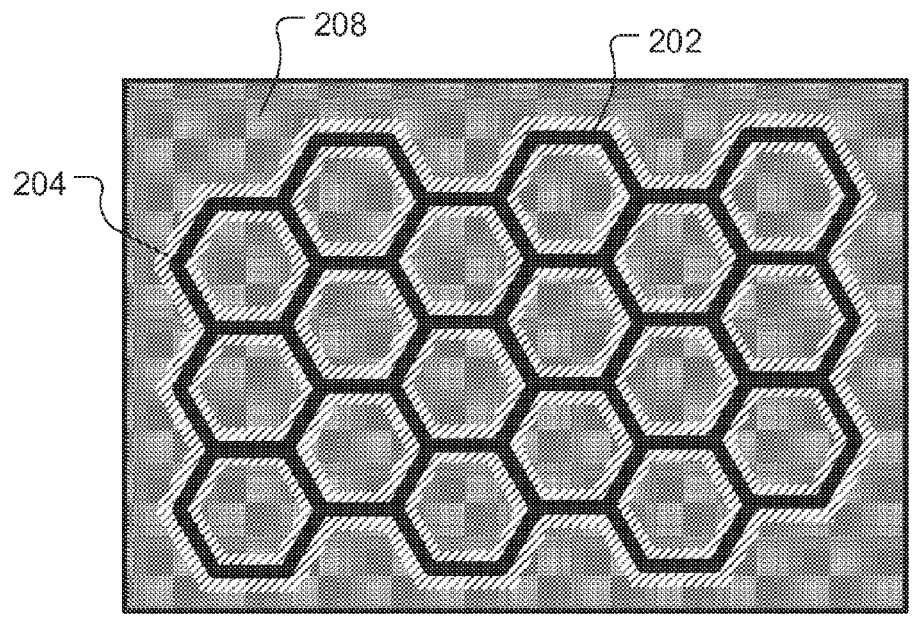
FIGS. 2A-2B show schematic diagrams of a honeycomb structure affixed to an example skin member with an adhesive.
Figure 2B:
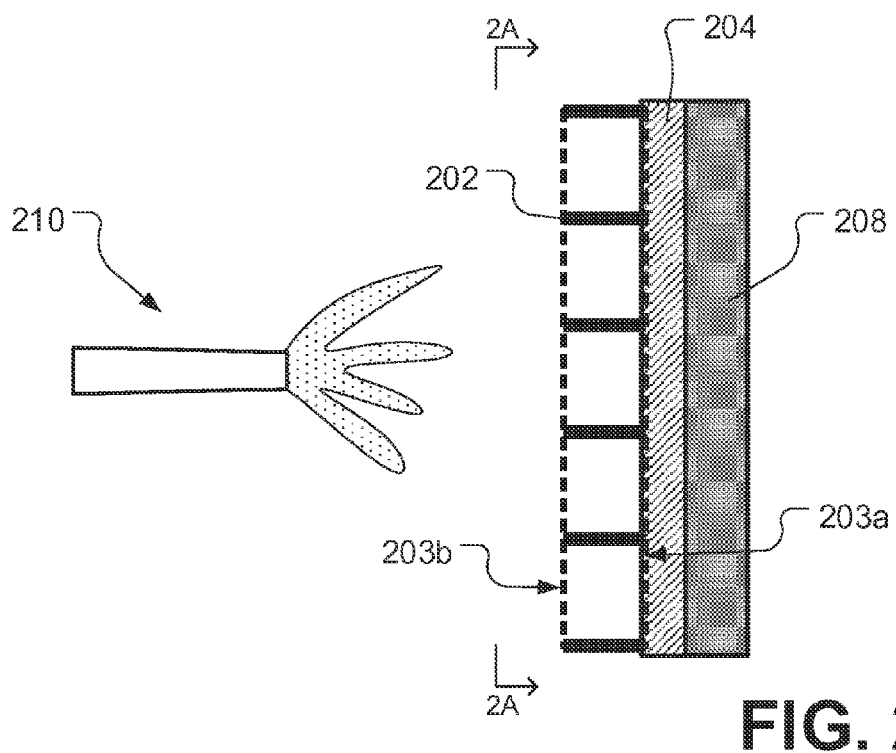

At 110, a first end of a honeycomb structure is bonded to a surface of a skin member with an adhesive. FIGS. 2A-2B show schematic diagrams of the honeycomb structure 202 affixed to an example skin member 208. The first end 203a of the honeycomb structure 202 is bonded to the skin member 208 with the adhesive 204. The honeycomb structure 202 can be a honeycomb core, an overexpanded core, a corrugated core, an array of tubing sections, or another structure that includes multiple connected cells. The honeycomb structure 202 can be a material such as a composite material, carbon fiber, plastic, paper, metal, a resin-coated material, or another material. In some cases, the cells of the honeycomb structure 202 have multiple surfaces, and adjacent cells can share a common surface, e.g., a vertical surface or other surface.

Figure 3A:
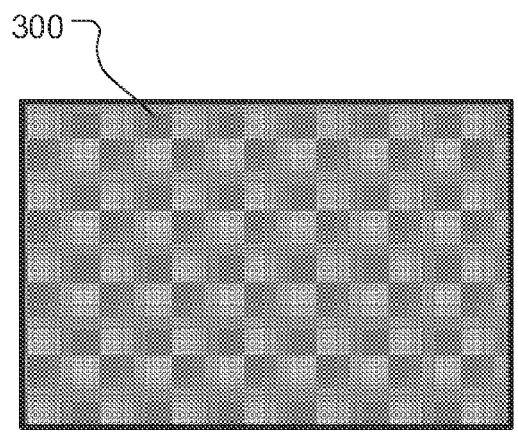
FIGS. 3A-3D are schematic diagrams that show example surfaces on a skin member.
Figure 3B:
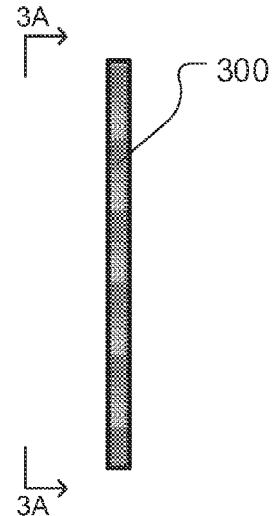
Figure 3C:
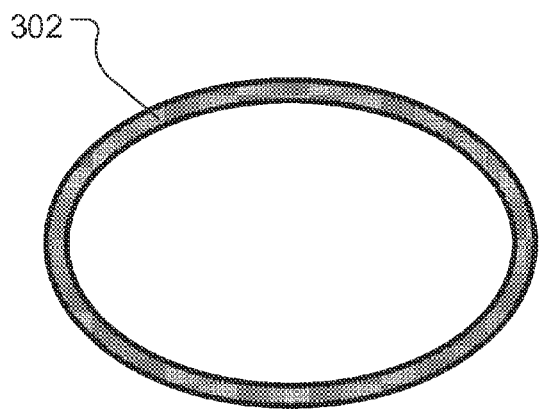
Figure 3D:
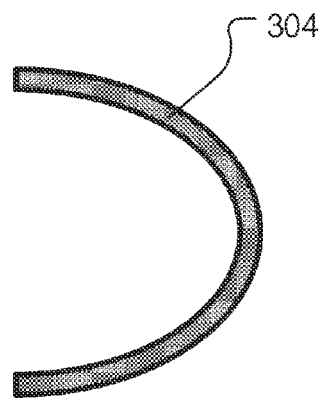

The skin member 208 is used for structural support within a component. For example, the skin member 208 could be included in a helicopter blade or in the example components listed above. The skin member 208 can be made of metal, a composite material, or other material or combination of materials. In some cases, multiple skin member portions are attached to form a larger skin member 208. The skin member 208 can have a substantially flat surface, a curved or contoured surface, an enclosed surface, an irregular surface, or another surface. FIGS. 3A-3D are diagrams that show example surfaces of a skin member. FIGS. 3A-3B show an example skin member 300 with a flat surface. An undeformed and flat honeycomb structure may be bonded to the flat surface of example skin member 302. FIG. 3C shows an example skin member 302 with a closed and contoured surface. The closed skin member 302 can enclose elements such as a honeycomb structure or foam. FIG. 3D shows a skin member with an open and contoured surface. For example, a honeycomb structure can be deformed to conform to the contour of a contoured skin member like example skin members 302 and 304.

The adhesive 204 can be an epoxy, glue, or other bonding agent, and be in a liquid form, a film, or in another form. In some cases, the adhesive 204 is applied to the skin member 208 and then the honeycomb structure 202 is bonded to the skin member 208. In some cases, the adhesive 204 is applied to the honeycomb structure 202 and then the honeycomb structure 202 is bonded to the skin member 208.

In some implementations, the adhesive 204 can be applied to the honeycomb structure 202 using the reticulation technique. In the reticulation technique, a film adhesive is positioned against a first end of the honeycomb structure, and a perforation is made in the film adhesive at each cell. The honeycomb structure and adhesive are heated such that the adhesive liquefies and spreads onto the surfaces of the first end of the honeycomb structure. The first end of the honeycomb structure is held against the skin member and the adhesive on the surfaces of the honeycomb structure is cured, bonding the first end of the honeycomb structure to the skin member.

Figure 4A:
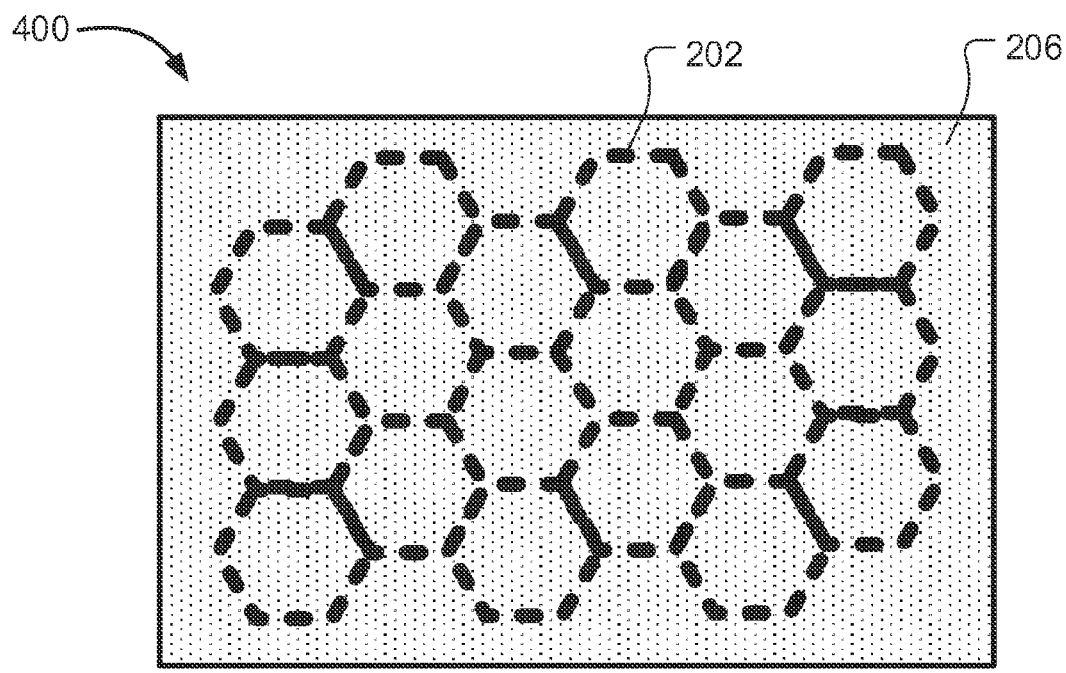
FIGS. 4A-4B show an example component after foam has been sprayed over the honeycomb structure.
Figure 4B:
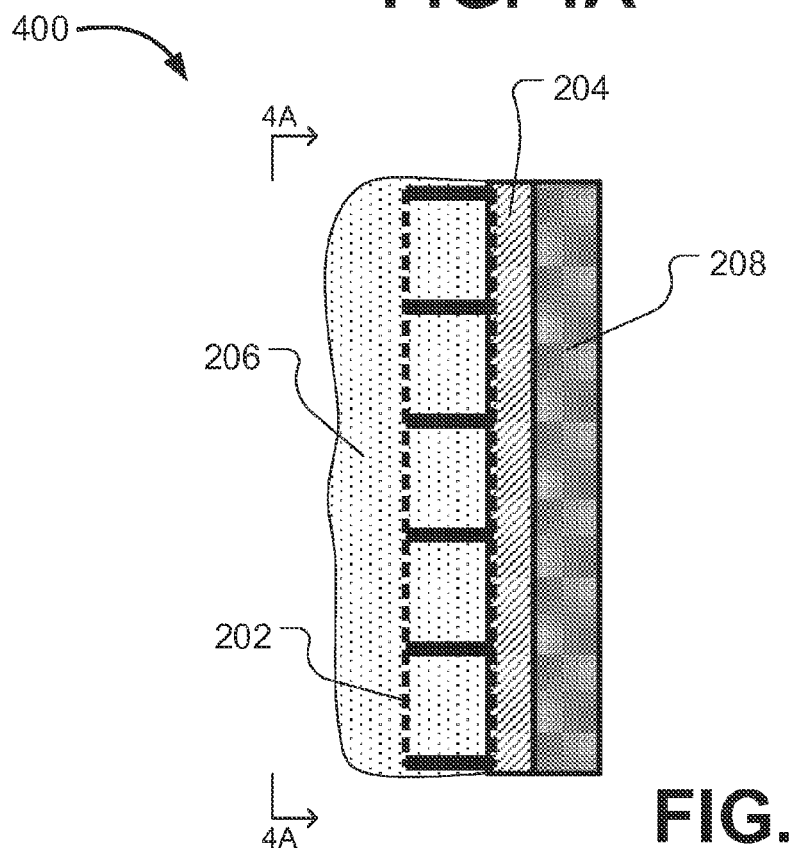
Figure 4C:
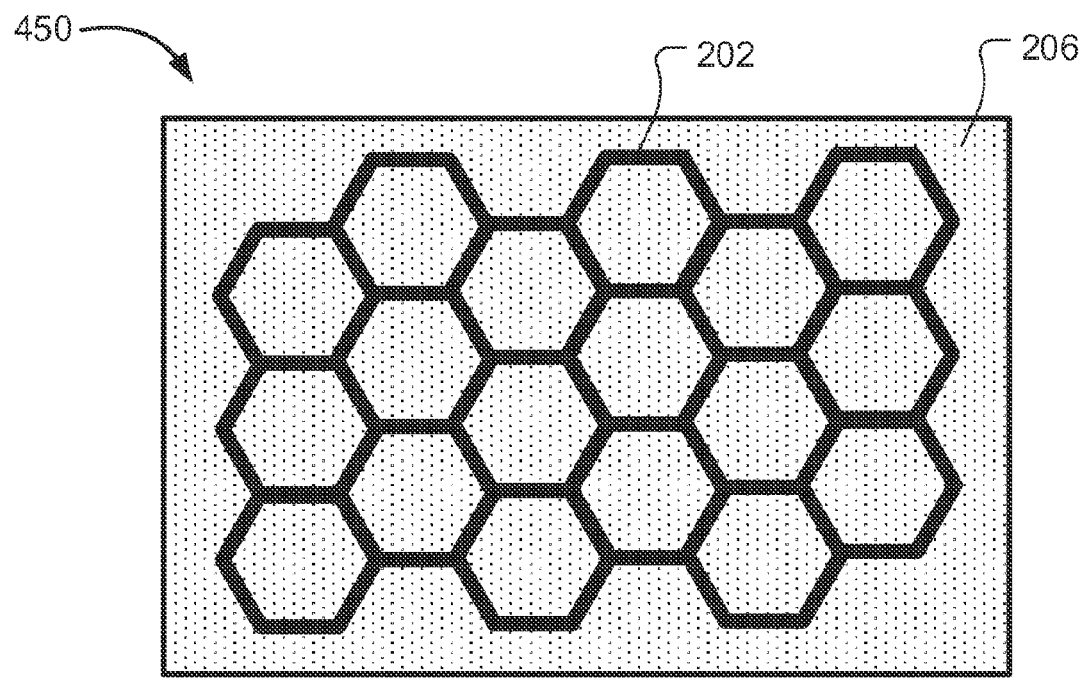
FIGS. 4C-4D show another example component after foam has been sprayed over the honeycomb structure.
Figure 4D:
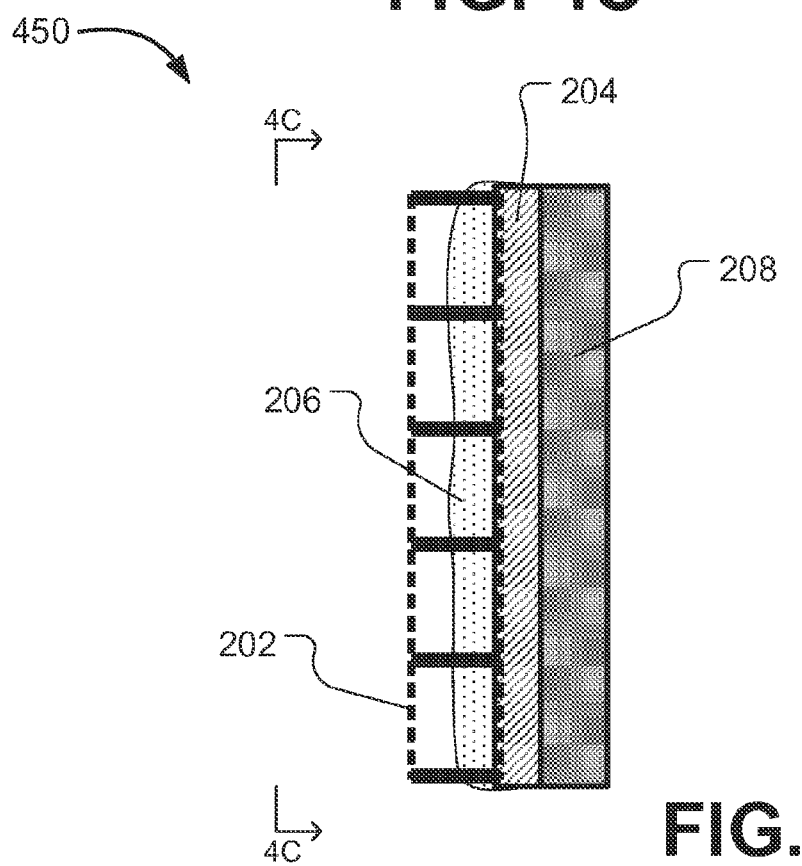

At 120, foam is sprayed on the second end (i.e., the end opposite the first end) of the honeycomb structure. The foam can be an expanding foam such as a urethane foam or polyurethane foam, a polymer foam, a resin foam, or other foam. In some implementations, the foam is applied in a liquid state, such as by spraying or pouring. For example, FIG. 2B shows a foam sprayer 210 spraying foam onto the second end 203b (i.e., the end opposite the first end 203a) of honeycomb structure 202 after the first end 203a of the honeycomb structure 202 has been bonded to the skin member 208. Spraying the foam on the second end of the honeycomb structure can include spraying a quantity of foam to fill at least a portion of a volume of the cells of the honeycomb structure. For example, the expanded foam can fill approximately 25%, 50%, or another portion of the volume of some cells. Spraying the foam can also include spraying a quantity of foam to form a foam thickness that is greater than a height of a tallest cell in the honeycomb structure. For example, the expanded foam can entirely fill some cells and enclose all or a portion of the honeycomb structure. For example, FIGS. 4A-4B and FIGS. 4C-4D show an example component 400 after foam 206 has been sprayed over the honeycomb structure 202. In FIGS. 4A-4B, a quantity of foam 206 has been sprayed such that the foam 206 thickness is greater than the height of the honeycomb structure 202. In FIGS. 4C-4D, a quantity of foam 206 has been sprayed such that foam 206 fills less than the entirety of some cells in the honeycomb structure 202.

Figure 5:
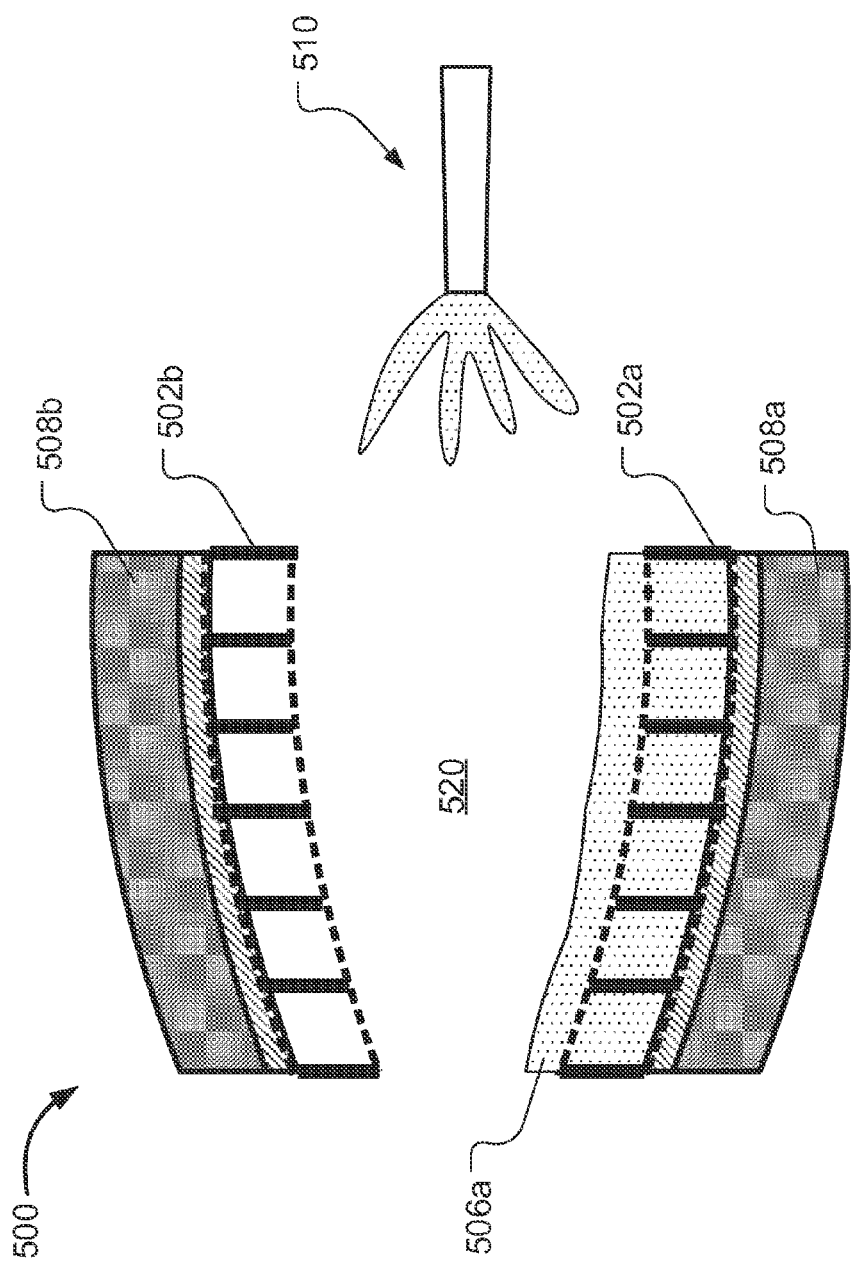
FIG. 5. shows a schematic diagram of an example configuration of spraying foam on multiple separate honeycomb structures.

In some implementations, the foam is sprayed on multiple separate honeycomb structures that have been respectively bonded to separate skin members. FIG. 5 shows an example configuration 500 including first honeycomb structure 502a bonded to a first skin member 508a and a second honeycomb structure 502b bonded to a second skin member 508b. Foam 506a has been sprayed onto the first honeycomb structure 502a. The first skin member 508a can be positioned adjacent an end of the second skin member 508b to form a void 520 such that the foam 506a on the first honeycomb structure 502a is adjacent an end of the second honeycomb structure 502b. In some cases, the void 520 surrounds a portion of another structural element such as a foam insert, another honeycomb structure, a support, or another structure. The first skin member 508a and the second skin member 508b can be positioned at an angle (e.g., greater than 0 degrees to at least 180 degrees) to define a space (i.e., the void 520). Foam is sprayed by foam sprayer 510 into the void 520, on the second honeycomb structure 502b, and on the foam 506a on the first honeycomb structure 502a. In this manner, the sprayed foam can form a structural connection between the first skin member 508a and the second skin member 508b.

Figure 6:
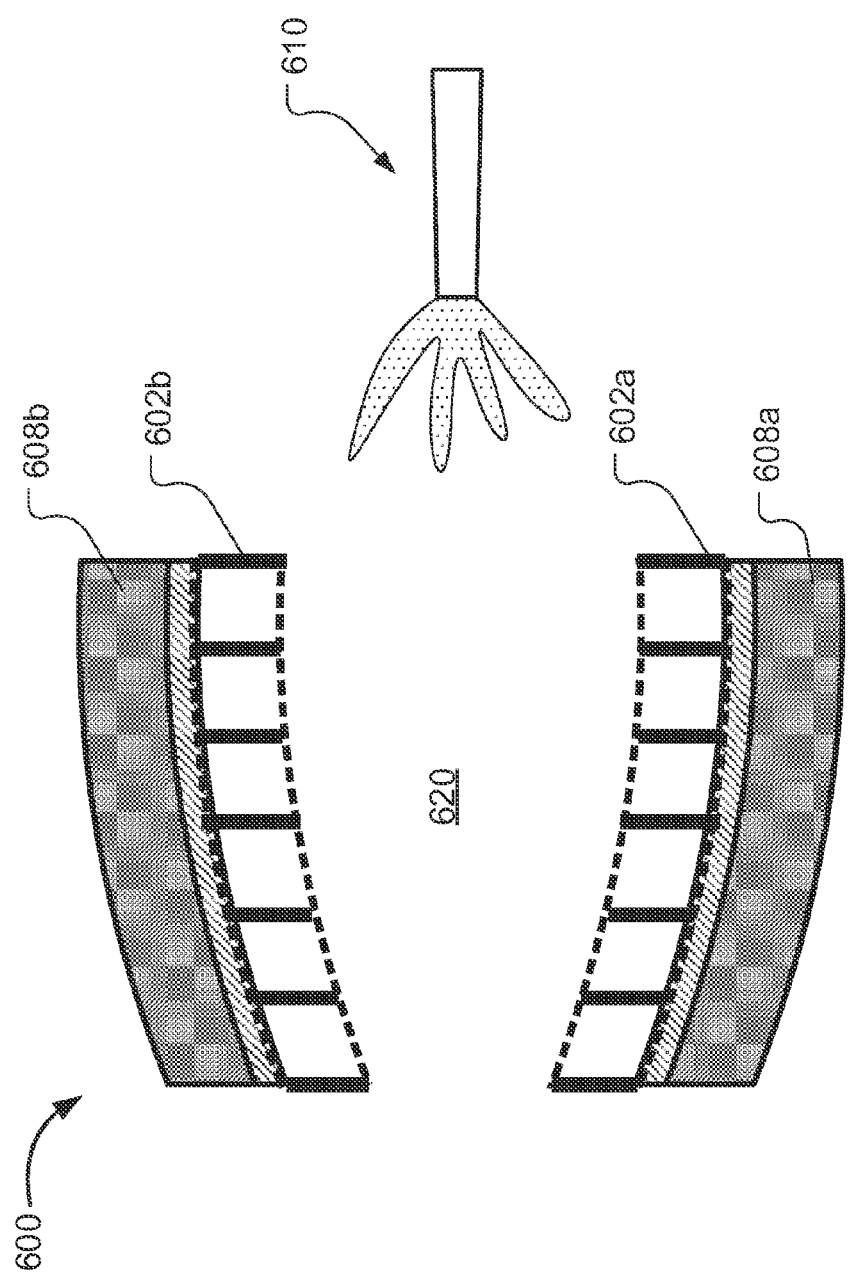
FIG. 6. shows a schematic diagram of another example configuration of spraying foam on multiple separate honeycomb structures.

FIG. 6 shows another example configuration 600 of separate honeycomb structures that have been bonded to skin members. In the implementation shown in FIG. 6, no foam has been sprayed onto either first honeycomb structure 602a or second honeycomb structure 602b. That is, no foam is present in the implementation shown in FIG. 6. The end of the first aircraft skin member 608a is positioned adjacent an end of the second aircraft skin member 608b to form a void 620 in which the first honeycomb structure 602a is positioned adjacent the second honeycomb structure 602b. The foam is sprayed in the void 620, on the first honeycomb structure 602a and on the second honeycomb structure 602b. In this manner, the sprayed foam can form another example structural connection between the first skin member 608a and the second skin member 608b.

At 130, the foam on the second end of the honeycomb structure is cured. The foam can be cured by a procedure such as drying, exposure to air, heating, or another method. In some cases, the foam is cured from a liquid state to a solid state. Curing the foam bonds the foam to the skin member and/or the honeycomb structure. In some cases, a single application of foam is cured, such as the foam 206 on example component 400 in FIGS. 4A-4B. As another example, in the configuration 600 of FIG. 6, the sprayed foam on the first honeycomb structure 602a and the second honeycomb structure 602b is cured. In some cases, multiple applications of foam are cured together. For example, in the configuration 500 of FIG. 5, the sprayed foam on the second honeycomb structure 502b and the foam 506a on the first honeycomb structure 5021 are cured together.

Figure 7:
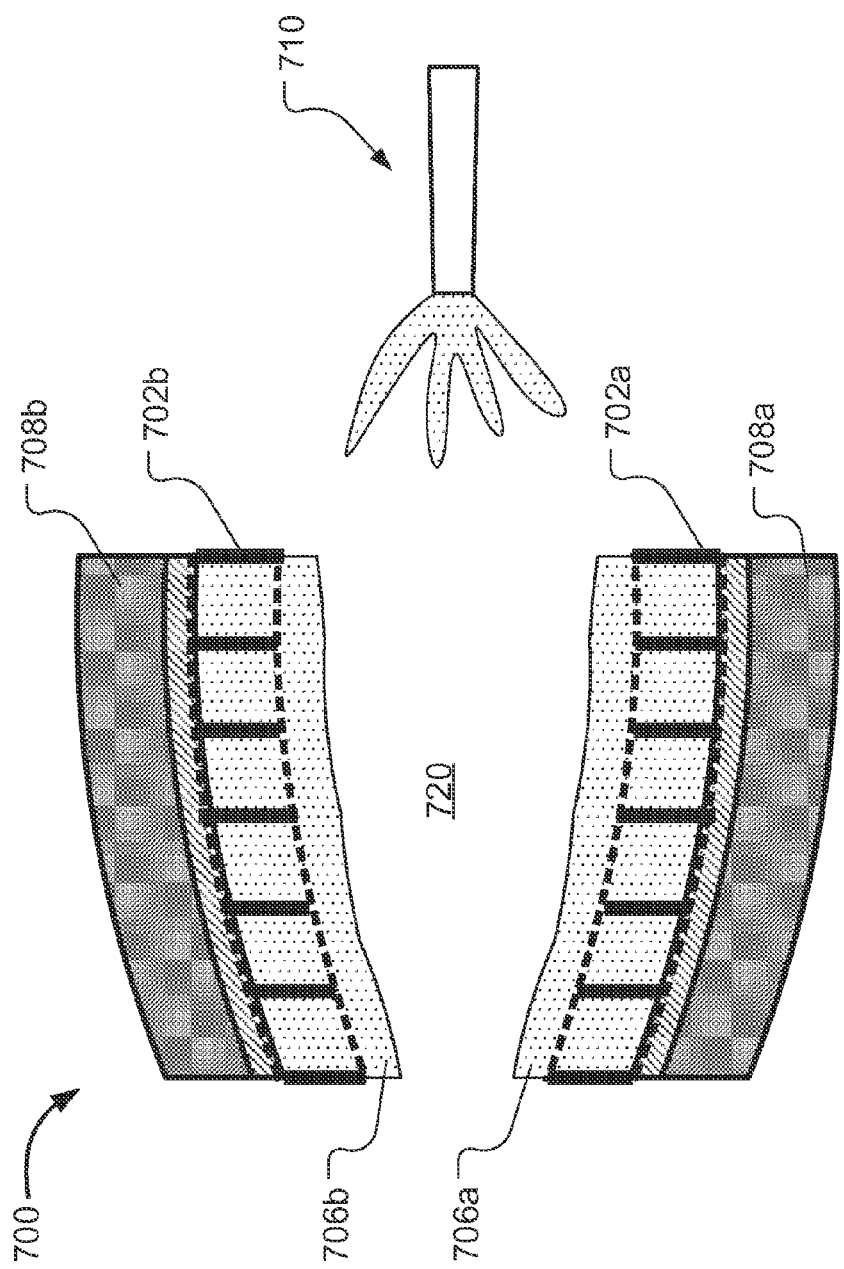
FIG. 7. shows a schematic diagram of another example configuration of spraying foam on multiple separate honeycomb structures.

In some cases, more than one application of foam is sprayed and cured on a component. For example, FIG. 7 shows example configuration 700 of separate honeycomb structures that have been bonded to skin members. In the implementation shown in FIG. 7, first foam 706a has been sprayed onto first honeycomb structure 702a. Additionally, second foam 706b has been sprayed onto second honeycomb structure 702b. In FIG. 7, the end of the first aircraft skin member 708a is positioned adjacent an end of the second aircraft skin member 708b to form a void 720 in which the first foam 706a on the first honeycomb structure 702a is positioned adjacent the second foam 706b on the second honeycomb structure 702b. More foam is sprayed in the void 720, on the first foam 706a on the first honeycomb structure 702a and on the second foam 706b on the second honeycomb structure 702b. In some cases, the first foam 706a and/or the second foam 706b are cured before foam is sprayed in the void 720. In some cases, the first foam 706a, the second foam 706b, and the foam sprayed in the void 720 are cured together. In this manner, the sprayed foam can form another example structural connection between the first skin member 508a and the second skin member 508b.

Figure 8A:
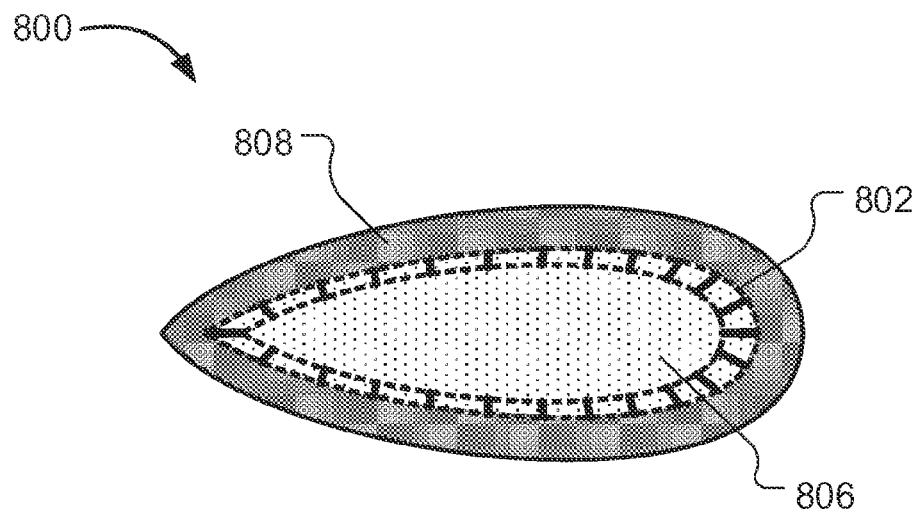
FIG. 8A is a schematic diagram showing an example of a rotorcraft.
Figure 8B:
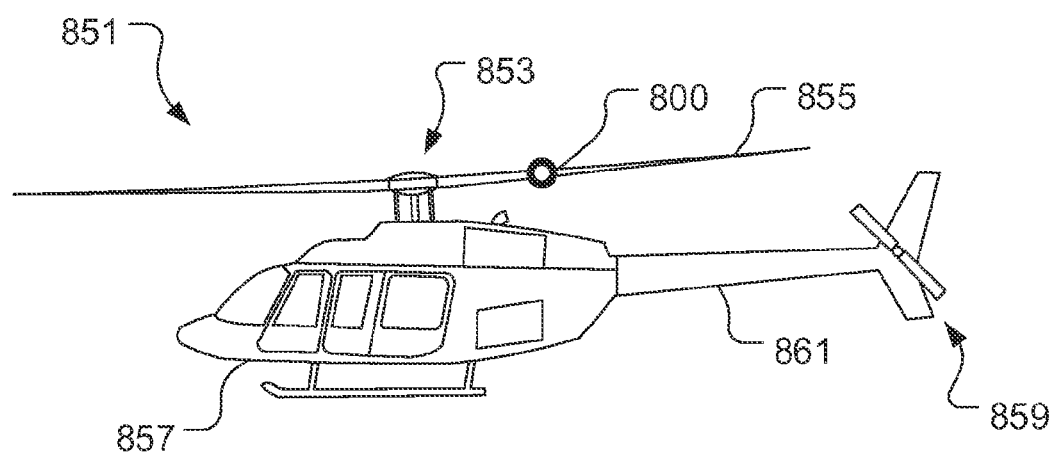
FIG. 8B is a schematic diagram showing an example rotor blade.

The process 100 can be used to form components for an aircraft. As an example, FIG. 8A shows a cross-section of an example rotor blade component 800 for a rotorcraft. The example rotor blade component 800 includes a honeycomb 802 bonded to a skin member 808. The rotor blade is filled with foam 856. The example rotor blade component 800 can be included in a rotorcraft such as example rotorcraft 851 shown in FIG. 8B. Rotorcraft 851 has a rotor system 853 with multiple rotor blades 855. Rotorcraft 851 can further include a fuselage 857, anti-torque system 859, and an empennage 861. Component 800 is shown in an example location on the rotor blade 855 of the rotorcraft 851, though components can be at other locations in the rotorcraft 501.

Figure 9:
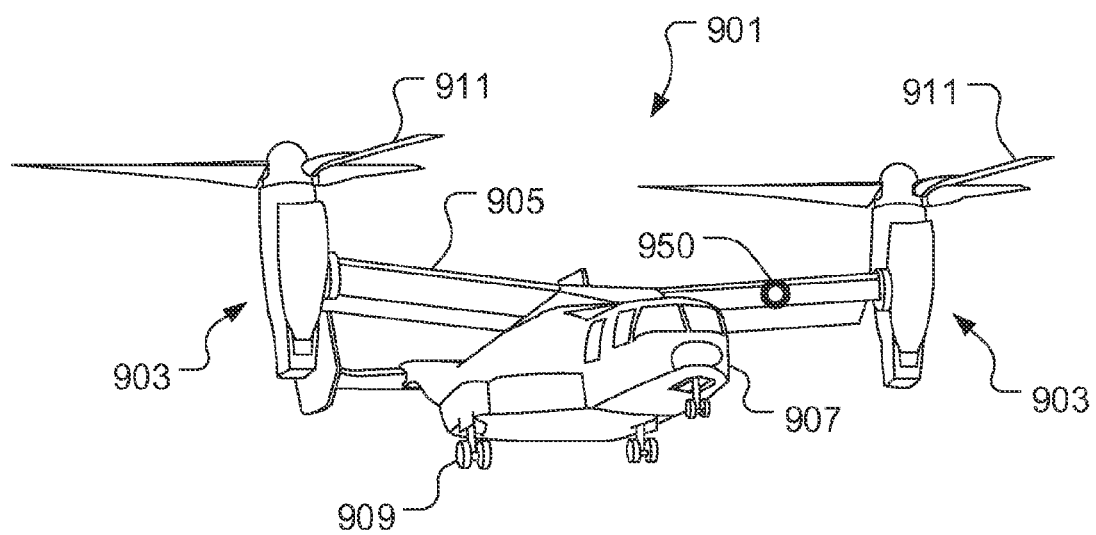
FIG. 9 is a schematic diagram showing an example of a tiltrotor aircraft.

As another example aircraft, FIG. 9 shows a schematic diagram of an example tiltrotor aircraft 901. Aircraft 901 includes a fuselage 907 with attached wings 905. Nacelles 903 are carried at the outboard ends of wings 905 and are rotatable between the helicopter-mode position shown and a forward-facing airplane-mode position (not shown). Nacelles 903 carry engines and transmissions for powering rotor systems 911 in rotation. An engine may be an internal combustion engine, an electrical power source and associated motor, or any other suitable technique for powering rotor system 911. The tiltrotor aircraft 901 can also include components that can be formed by process 100. Component 950 is shown in an example location on the wing 905 of the tiltrotor aircraft 901, though components can be at other locations in the tiltrotor aircraft 901.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of forming an aircraft component, the method comprising:
   bonding a first end of a honeycomb structure to a surface of an aircraft skin member, the honeycomb structure comprising a plurality of connected cells;
   spraying foam on a second end of the honeycomb structure, the second end opposite the first end;
   curing the foam on the second end of the honeycomb structure;
   wherein the aircraft skin member is a first aircraft skin member and the honeycomb structure is a first honeycomb structure, and wherein the method further comprises:
   bonding a first end of a second honeycomb structure to a surface of a second aircraft skin member, the second honeycomb structure comprising a plurality of connected cells;
   positioning an end of the first aircraft skin member adjacent an end of the second aircraft skin member to form a void in which the foam on the first honeycomb structure is positioned adjacent the second honeycomb structure;
   spraying foam in the void and on a second end of the second honeycomb structure and the foam on the first honeycomb structure, the second end of the second honeycomb structure opposite the first end of the second honeycomb structure; and
   curing the foam on the second end of the second honeycomb structure and the foam on the first honeycomb structure.

2. The method of claim 1, wherein spraying the foam on the second end of the honeycomb structure comprises spraying a quantity of foam to fill at least a portion of a volume of the plurality of connected cells of the honeycomb structure.

3. The method of claim 1, wherein spraying the foam on the second end of the honeycomb structure comprises spraying a quantity of foam to form a foam thickness that is greater than a height of a tallest cell of the plurality of connected cells.

4. The method of claim 1, wherein the aircraft skin member is included in a helicopter blade.

5. The method of claim 1, wherein the surface of the aircraft skin member is at least one of a flat surface, an open contoured surface or a closed contoured surface.

6. The method of claim 1, wherein bonding the first end of a honeycomb structure to the surface of the aircraft skin member comprises bonding the first end of the honeycomb structure in an undeformed state to the surface.

7. The method of claim 1, further comprising deforming the honeycomb structure before bonding the first end of the honeycomb structure to the surface of the aircraft skin member.

8. A method of forming an aircraft component, the method comprising:
   bonding a first end of a honeycomb structure to a surface of an aircraft skin member, the honeycomb structure comprising a plurality of connected cells, each cell comprising a plurality of surfaces, wherein adjacent cells share a common vertical surface;
   spraying foam in a fluid state on a second end of the honeycomb structure, the second end opposite the first end;
   curing the foam on the second end of the honeycomb structure from the fluid state to a solid state to bond the foam in the solid state to the aircraft skin member;
   wherein the aircraft skin member is a first aircraft skin member and the honeycomb structure is a first honeycomb structure, and wherein the method further comprises:
   bonding a first end of a second honeycomb structure to a surface of a second aircraft skin member, the second honeycomb structure comprising a plurality of connected cells;
   positioning an end of the first aircraft skin member adjacent an end of the second aircraft skin member to form a void in which the foam on the first honeycomb structure is positioned adjacent the second honeycomb structure;
   spraying foam in a liquid state in the void and on a second end of the second honeycomb structure and the foam in the solid state on the first honeycomb structure, the second end of the second honeycomb structure opposite the first end of the second honeycomb structure; and
   curing the foam in the liquid state on the second end of the second honeycomb structure and the foam in the solid state on the first honeycomb structure to a solid state to attach the first aircraft skin member to the second aircraft skin member.

9. A method of forming an aircraft component, the method comprising:
   bonding a first end of a honeycomb structure to a surface of an aircraft skin member, the honeycomb structure comprising a plurality of connected cells;
   spraying foam on a second end of the honeycomb structure, the second end opposite the first end;

curing the foam on the second end of the honeycomb structure;

wherein the aircraft skin member is a first aircraft skin member and the honeycomb structure is a first honeycomb structure, and wherein the method further comprises, before spraying foam on the second end of the first honeycomb structure and curing the foam on the second end of the first honeycomb structure:

bonding a first end of a second honeycomb structure to a surface of a second aircraft skin member, the second honeycomb structure comprising a plurality of connected cells;

positioning an end of the first aircraft skin member adjacent an end of the second aircraft skin member to form a void in which the first honeycomb structure is positioned adjacent the second honeycomb structure;

spraying foam in the void and on the second end of the first honeycomb structure and a second end of the second honeycomb structure, the second end of the second honeycomb structure opposite the first end of the second honeycomb structure; and curing the foam on the second end of the first honeycomb structure and the second end of the second honeycomb structure.

10. The method of claim 9, wherein the aircraft skin member is included in a helicopter blade.

11. The method of claim 9, wherein the surface of the aircraft skin member is at least one of a flat surface, an open contoured surface or a closed contoured surface.

12. The method of claim 9, wherein bonding the first end of a honeycomb structure to the surface of the aircraft skin member comprises bonding the first end of the honeycomb structure in an undeformed state to the surface.

13. The method of claim 9, further comprising deforming the honeycomb structure before bonding the first end of the honeycomb structure to the surface of the aircraft skin member.

14. A method of forming an aircraft component, the method comprising:

bonding a first end of a honeycomb structure to a surface of an aircraft skin member, the honeycomb structure comprising a plurality of connected cells;

spraying foam on a second end of the honeycomb structure, the second end opposite the first end;

curing the foam on the second end of the honeycomb structure;

wherein the aircraft skin member is a first aircraft skin member and the honeycomb structure is a first honeycomb structure, and wherein the method further comprises:

bonding a first end of a second honeycomb structure to a surface of a second aircraft skin member, the second honeycomb structure comprising a plurality of connected cells;

spraying foam on a second end of the second honeycomb structure, the second end opposite the first end of the second honeycomb structure;

curing the foam on the second end of the second honeycomb structure;

positioning an end of the first aircraft skin member adjacent an end of the second aircraft skin member to form a void in which the foam on the first honeycomb structure is positioned adjacent the foam on the second honeycomb structure;

spraying foam in the void and on the foam on the first honeycomb structure and the foam in the second honeycomb structure; and curing the foam sprayed in the void and on the foam on the first honeycomb structure and the foam in the second honeycomb structure.

15. The method of claim 14, wherein the aircraft skin member is included in a helicopter blade.

16. The method of claim 14, wherein the surface of the aircraft skin member is at least one of a flat surface, an open contoured surface or a closed contoured surface.

17. The method of claim 14, wherein bonding the first end of a honeycomb structure to the surface of the aircraft skin member comprises bonding the first end of the honeycomb structure in an undeformed state to the surface.

18. The method of claim 14, further comprising deforming the honeycomb structure before bonding the first end of the honeycomb structure to the surface of the aircraft skin member.

19. A method of forming an aircraft component, the method comprising:

bonding a first end of a honeycomb structure to a surface of an aircraft skin member, the honeycomb structure comprising a plurality of connected cells, each cell comprising a plurality of surfaces, wherein adjacent cells share a common vertical surface;

spraying foam in a fluid state on a second end of the honeycomb structure, the second end opposite the first end;

curing the foam on the second end of the honeycomb structure from the fluid state to a solid state to bond the foam in the solid state to the aircraft skin member;

wherein the aircraft skin member is a first aircraft skin member and the honeycomb structure is a first honeycomb structure, and wherein the method further comprises, before spraying foam on the second end of the first honeycomb structure and curing the foam on the second end of the first honeycomb structure:

bonding a first end of a second honeycomb structure to a surface of a second aircraft skin member, the second honeycomb structure comprising a plurality of connected cells;

positioning an end of the first aircraft skin member adjacent an end of the second aircraft skin member to form a void in which the first honeycomb structure is positioned adjacent the second honeycomb structure;

spraying foam in a liquid state in the void and on the second end of the first honeycomb structure and a second end of the second honeycomb structure, the second end of the second honeycomb structure opposite the first end of the second honeycomb structure; and curing the foam in the liquid state on the second end of the first honeycomb structure and the second end of the second honeycomb structure to a solid state to attach the first aircraft skin member to the second aircraft skin member.

20. A method of forming an aircraft component, the method comprising:

bonding a first end of a honeycomb structure to a surface of an aircraft skin member, the honeycomb structure comprising a plurality of connected cells, each cell comprising a plurality of surfaces, wherein adjacent cells share a common vertical surface;

spraying foam in a fluid state on a second end of the honeycomb structure, the second end opposite the first end;

curing the foam on the second end of the honeycomb structure from the fluid state to a solid state to bond the foam in the solid state to the aircraft skin member;

wherein the aircraft skin member is a first aircraft skin member and the honeycomb structure is a first honeycomb structure, and wherein the method further comprises:

bonding a first end of a second honeycomb structure to a surface of a second aircraft skin member, the second honeycomb structure comprising a plurality of connected cells;

spraying foam in a liquid state on a second end of the second honeycomb structure, the second end opposite the first end of the second honeycomb structure;

curing the foam in the liquid state on the second end of the second honeycomb structure to a solid state;

positioning an end of the first aircraft skin member adjacent an end of the second aircraft skin member to form a void in which the foam in the solid state on the first honeycomb structure is positioned adjacent the foam in the solid state on the second honeycomb structure;

spraying foam in a liquid state in the void and on the foam in the solid state on the first honeycomb structure and the foam in the solid state in the second honeycomb structure; and curing the foam in the liquid state sprayed in the void and on the foam in the solid state on the first honeycomb structure and the foam in the solid state in the second honeycomb structure to a solid state to attach the first aircraft skin member to the second aircraft skin member.

* * * * *